US012388180B2

(12) United States Patent
Xie et al.

(10) Patent No.: US 12,388,180 B2
(45) Date of Patent: Aug. 12, 2025

(54) ANTENNA STRUCTURE AND WIRELESS COMMUNICATION DEVICE HAVING SAME

(71) Applicants: Futaijing Precision Electronics (Yantai) Co., Ltd., Yantai (CN); HON HAI PRECISION INDUSTRY CO., LTD., New Taipei (TW)

(72) Inventors: Jia-Ying Xie, New Taipei (TW); Jia-Hung Hsiao, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 256 days.

(21) Appl. No.: 17/868,237

(22) Filed: Jul. 19, 2022

(65) Prior Publication Data

US 2023/0070301 A1 Mar. 9, 2023

(30) Foreign Application Priority Data

Sep. 7, 2021 (CN) ......................... 202111045974.8

(51) Int. Cl.
*H01Q 5/335* (2015.01)
*H01Q 1/24* (2006.01)

(52) U.S. Cl.
CPC ............. *H01Q 5/335* (2015.01); *H01Q 1/243* (2013.01)

(58) Field of Classification Search
CPC ........ H01Q 5/335; H01Q 1/243; H01Q 5/328; H01Q 5/385; H01Q 3/22; H01Q 23/00; H01Q 3/44; H01Q 3/247
See application file for complete search history.

(56) References Cited

U.S. PATENT DOCUMENTS 7,728,785 B2 * 6/2010 Ozden .................. H01Q 9/0421 343/866
9,711,858 B1 * 7/2017 Lee .......................... H01Q 9/06
2003/0210206 A1 * 11/2003 Phillips .................. H01Q 5/378 343/895
2006/0022889 A1 * 2/2006 Chiang .................... H01Q 9/36 343/834
2012/0229347 A1 * 9/2012 Jin ......................... H01Q 21/28 343/702

(Continued)

FOREIGN PATENT DOCUMENTS

CN 113193335 A 7/2021

*Primary Examiner* — Dimary S Lopez Cruz
*Assistant Examiner* — Bamidele A Immanuel
(74) *Attorney, Agent, or Firm* — ScienBiziP, P.C.

(57) ABSTRACT

An antenna structure and a wireless communication device having the antenna structure are provided, the antenna structure includes a metal frame, a feeding portion, a first ground portion, and a second ground portion. The metal frame defines a first gap, a second gap, and a third gap, the metal frame between the first gap and the second gap forms a first radiating portion, the metal frame between the first gap and the third gap and the metal frame on a side of the third gap cooperatively form a second radiating portion, the metal frame on a side of the second gap forms a third radiating portion. The feeding portion is connected to the first radiating portion. The first ground portion is apart from the feeding portion and connected to the first radiating portion. The second ground portion closes to the second gap and is connected to the third radiating portion.

8 Claims, 14 Drawing Sheets

(56) References Cited

U.S. PATENT DOCUMENTS

| | | | | |
|---|---|---|---|---|
| 2016/0164168 | A1* | 6/2016 | Choi | H01Q 9/26 343/702 |
| 2016/0190685 | A1* | 6/2016 | Desclos | H01Q 3/22 342/368 |
| 2018/0026333 | A1* | 1/2018 | Lee | H01Q 13/18 343/702 |
| 2018/0026336 | A1* | 1/2018 | Chen | H04Q 1/48 343/702 |
| 2018/0026339 | A1* | 1/2018 | Chih | H01Q 5/35 343/702 |
| 2018/0062270 | A1* | 3/2018 | Liang | H01Q 1/243 |
| 2018/0131092 | A1* | 5/2018 | Liou | H01Q 1/243 |
| 2018/0159221 | A1* | 6/2018 | Liou | H01Q 5/50 |
| 2018/0166769 | A1* | 6/2018 | Chang | H01Q 5/335 |
| 2019/0097319 | A1* | 3/2019 | Hsieh | H01Q 1/243 |
| 2019/0181552 | A1* | 6/2019 | Lee | H01Q 3/247 |
| 2019/0348750 | A1* | 11/2019 | Lin | H01Q 9/42 |
| 2019/0372223 | A1* | 12/2019 | Hsu | H01Q 1/241 |
| 2020/0058981 | A1* | 2/2020 | Chang | H01Q 1/48 |
| 2021/0126349 | A1* | 4/2021 | Zhou | H01Q 1/36 |
| 2021/0151861 | A1* | 5/2021 | Chen | H04B 1/006 |
| 2021/0151886 | A1* | 5/2021 | Wang | H01Q 9/42 |
| 2021/0210839 | A1* | 7/2021 | Hsu | H01Q 1/38 |
| 2021/0218130 | A1* | 7/2021 | Chen | H01Q 13/10 |
| 2022/0385311 | A1* | 12/2022 | Shin | H01Q 5/328 |
| 2023/0387572 | A1* | 11/2023 | Xing | H01Q 21/0006 |

* cited by examiner

ANTENNA STRUCTURE AND WIRELESS COMMUNICATION DEVICE HAVING SAME

CROSS-REFERENCE TO RELATED APPLICATIONS

This application claims priority to Chinese Patent Application No. 202111045974.8 filed on Sep. 7, 2021, in China National Intellectual Property Administration, the contents of which are incorporated by reference herein.

FIELD

The subject matter herein generally relates to wireless communication, and more particularly to an antenna structure of a wireless communication device having the antenna structure.

BACKGROUND

With the continuous development and evolution of wireless communication technology, the space for accommodating an antenna inside mobile terminal products, such as mobile phones, has reduced. Moreover, with the development of wireless communication technology, the demand for antenna bandwidth is also increasing. Therefore, obtaining an antenna with a wider bandwidth in a more limited space is challenging.

BRIEF DESCRIPTION OF THE DRAWINGS

Implementations of the present disclosure will now be described, by way of embodiments, with reference to the attached figures.

DETAILED DESCRIPTION

Figure 1:
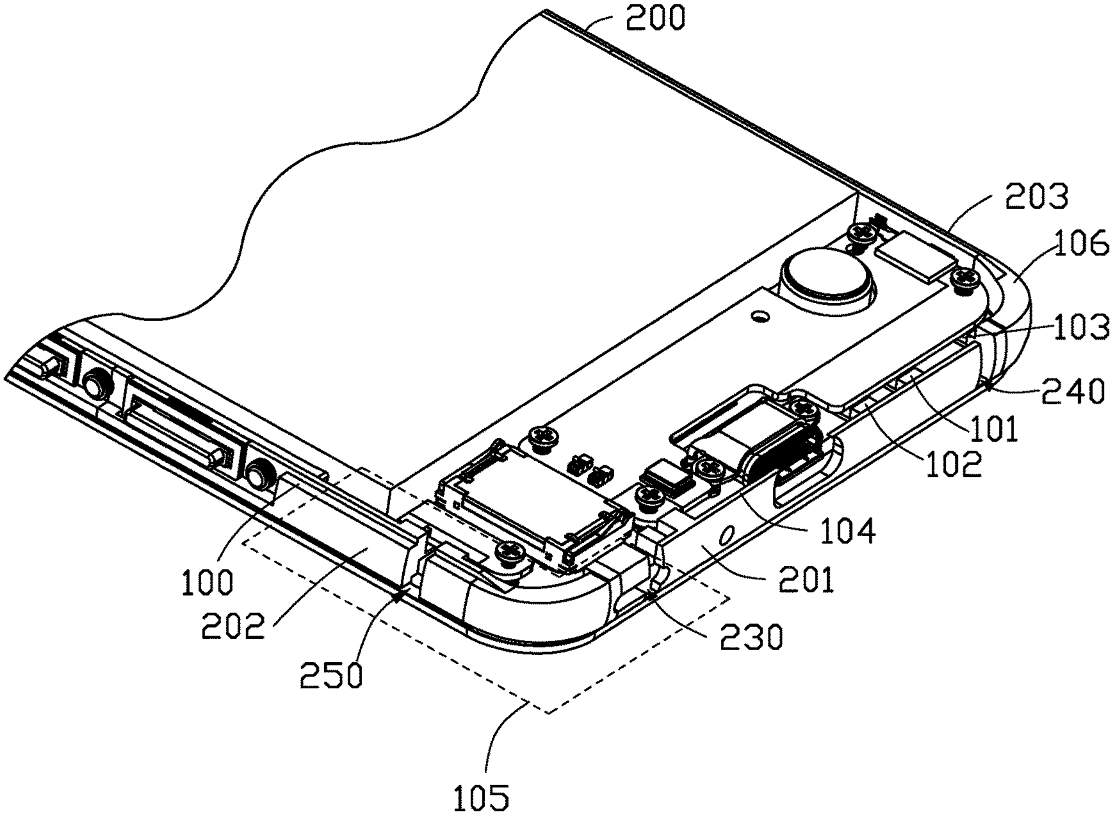
FIG. 1 is a schematic diagram of a wireless communication device having an antenna structure according to a first embodiment of the present application.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term “coupled” is defined as connected, whether directly or indirectly through intervening components, and is not necessarily limited to physical connections. The connection can be such that the objects are permanently connected or releasably connected. The term “substantially” is defined to be essentially conforming to the particular dimension, shape, or another word that “substantially” modifies, such that the component need not be exact. For example, “substantially cylindrical” means that the object resembles a cylinder, but can have one or more deviations from a true cylinder. The term “comprising” means “including, but not necessarily limited to”; it specifically indicates open-ended inclusion or membership in a so-described combination, group, series, and the like.

Figure 2:
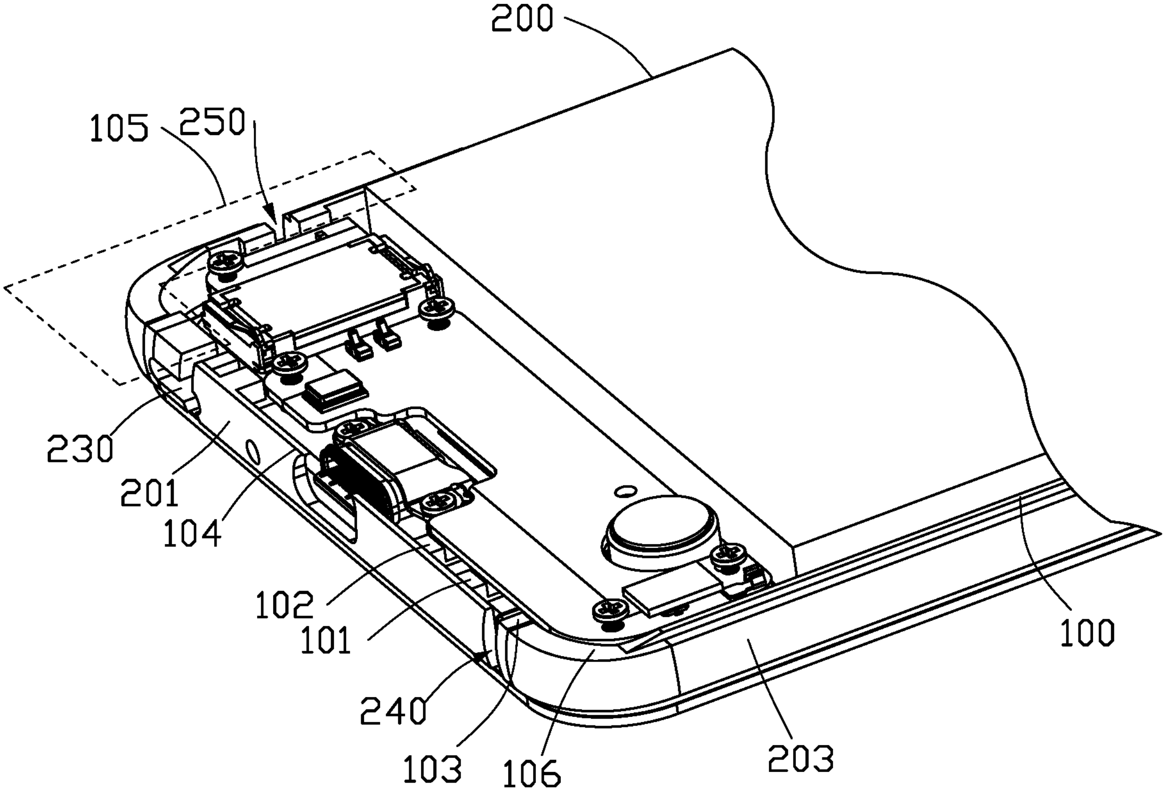
FIG. 2 is a schematic diagram of the wireless communication device shown in FIG. 1 from another angle.
Figure 3:
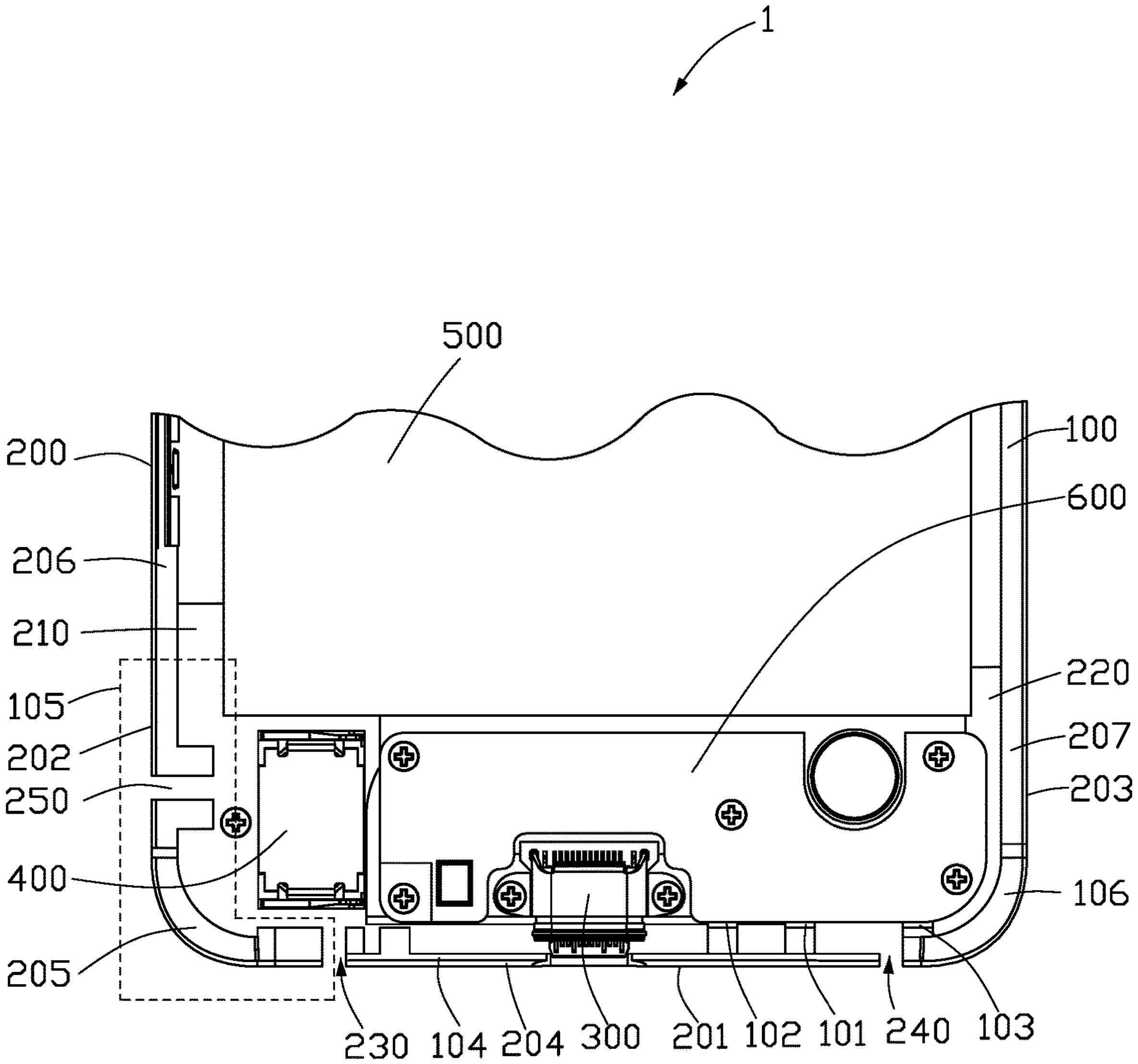
FIG. 3 is a plane diagram of the wireless communication device shown in FIG. 1.

FIGS. 1-3 show at least one embodiment of an antenna structure 100 that can be applied to a wireless communication device 1, such as a mobile phone or personal digital assistant, for transmitting and receiving radio waves for transmitting and exchanging wireless signals. The wireless communication device 1 includes the antenna structure 100, a connector 300, a speaker 400, a battery 500, and a circuit board 600.

The antenna structure 100 includes a metal frame 200, a feeding portion 101, a first ground portion 102, a second ground portion 103, a first radiating portion 104, a second radiating portion 105, a third radiating portion 106, a first matching circuit 110, a second matching circuit 120, and a third matching circuit 130.

The frame portion 110 is arranged on a periphery of the middle frame portion 111.

The metal frame 200 is a substantially annular structure made of metal or other conductive material. The metal frame

200 at least includes a first side 201, a second side 202, and a third side 203. The second side 202 and the third side 203 are connected to opposite ends of the first side 201. In at least one embodiment, the first side 201 may be a bottom side of the metal frame 200. The first side 201 defines a first gap 230 and a second gap 240 at intervals. The first gap 230 and the second gap 240 are arranged on positions close to opposite ends of the first side 201. The second side 202 defines a third gap 250 on an end close to the first side 201.

The first side 201, the second side 202, and the third side 203 jointly divide the metal frame 200 into a first metal section 204, a second metal section 205, a third metal section 206, and a fourth metal section 207 arranged at intervals. The first metal section 204 is a portion of the metal frame 200 between the first gap 230 and the second gap 240. The second metal section 205 is a portion of the metal frame 200 between the first gap 230 and the third gap 250. The third metal section 206 is a portion of the metal frame 200 that is on a side of the third gap 250 opposite to the first metal section 204. The fourth metal section 207 is a portion of the metal frame 200 that is on a side of the second gap 240 opposite to the first metal section 204.

The first metal section 204 forms the first radiating portion 104. The second metal section 205 and a portion of the third metal section 206 close to the second metal section 205 cooperatively form the second radiating portion 105. The fourth metal section 207 forms the third radiating portion 106.

The feeding portion 101 is electrically connected to a feed source of the first circuit board 600 through the first matching circuit 110, for feeding current. The first ground portion 102 is grounded through the second matching circuit 120 for grounding the antenna structure 100. The second ground portion 103 is grounded through the third matching circuit 130 for grounding the antenna structure 100.

Figure 4:
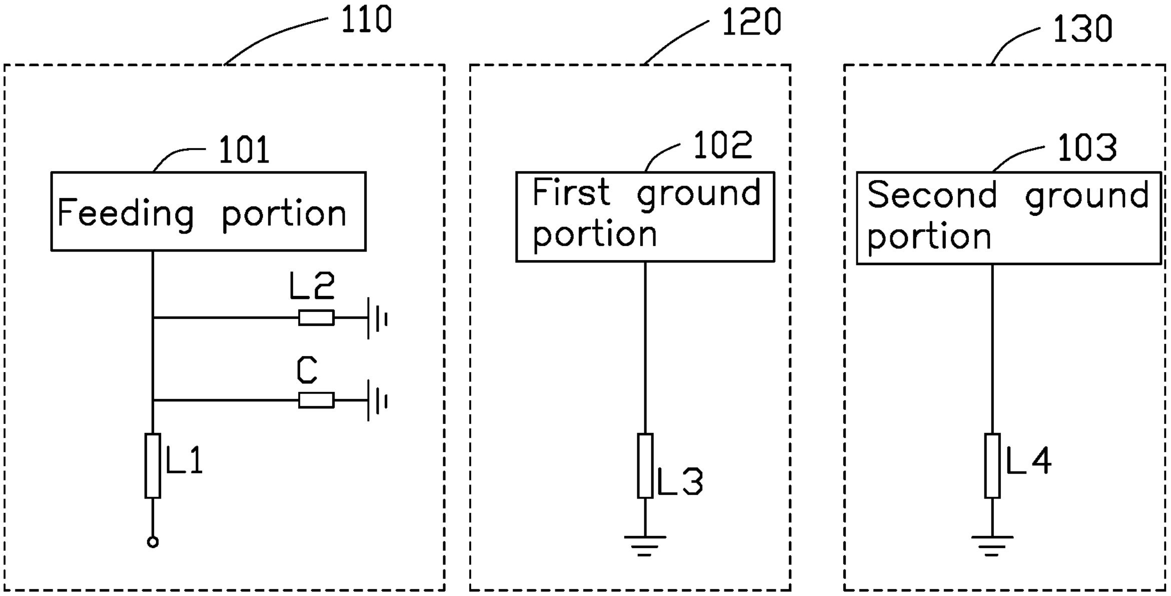
FIG. 4 is circuit diagrams of a first matching circuit, a second matching circuit, and a third matching circuit of the antenna structure according to the first embodiment of the present application.

Referring to FIG. 4, the first matching circuit 110 includes a first inductor L1, a second inductor L2, and a capacitor C. One end of the first inductor L1 is electrically connected to the feed source of the first circuit board 600, and the other end of the first inductor L1 is electrically coupled to the feeding portion 101. One end of the second inductor L2 is electrically coupled between the feeding portion 101 and the first inductor L1, and the other end of the second inductor L2 is grounded. One end of the capacitor C is grounded, and the other end of the capacitor C is electrically coupled between the feeding portion 101 and the first inductor L1, that is, the capacitor C is in parallel with the second inductor L2.

The second matching circuit 120 includes a third inductor L3. One end of the third inductor L3 is electrically coupled to the first ground portion 102, and the other end of the third inductor L3 is grounded. The third matching circuit 130 includes a fourth inductor L4. One end of the fourth inductor L4 is electrically coupled to the second ground portion 103, and the other end of the fourth inductor L4 is grounded.

The battery 500 is spaced away from the second side 202 and the third side 203. A first groove 210 is formed between the battery 500 and the second side 202. The first circuit board 600 is spaced apart from the first side 201 and the third side 203. A second groove 220 is formed between the first circuit board 600 and the third side 203. The first gap 230, the second gap 240, and the third gap 250 communicate with the first groove 210 and the second groove 220. In one embodiment, the first gap 230, the second gap 240, and the third gap 250 are infilled with an insulating material (such as plastic, rubber, glass, wood, ceramic, or the like).

The connector 300 is between the first radiating portion 104 and the first circuit board 600. The first radiating portion 104 defines an opening at a position corresponding to the connector 300, the connector 300 may connect to an external device through the opening. The speaker 400 is between the first circuit board 600 and the second side 202.

As the feeding portion 101 feeds current, the current flows through the first radiating portion 104, flows to the second gap 240 and is coupled to the third radiating portion 106, and is grounded through the second ground portion 103, thereby exciting a first mode to generate a radiation signal in a first radiation frequency band. At least one embodiment, the first mode may include a middle frequency mode, the first radiation frequency band may include 1710-2170 MHz frequencies.

As the feeding portion 101 feeds current, the current flows through the first radiating portion 104, flows to the first gap 230 and the third gap 250, is coupled to the second radiating portion 105, and is grounded through the first ground portion 102, thereby exciting a second mode to generate a radiation signal in a second radiation frequency band. At least one embodiment, the second mode may include a high frequency mode, the second radiation frequency band may include 2496-2690 MHz frequencies.

Referring to FIG. 4, in at least one embodiment, an inductance of each of the first matching circuit 110, the second matching circuit 120, and the third matching circuit 130 may be a fixed value. By adjusting a length of the first groove 210, the high frequency (2496-2690 MHz) mode offset can be adjusted.

Figure 5:
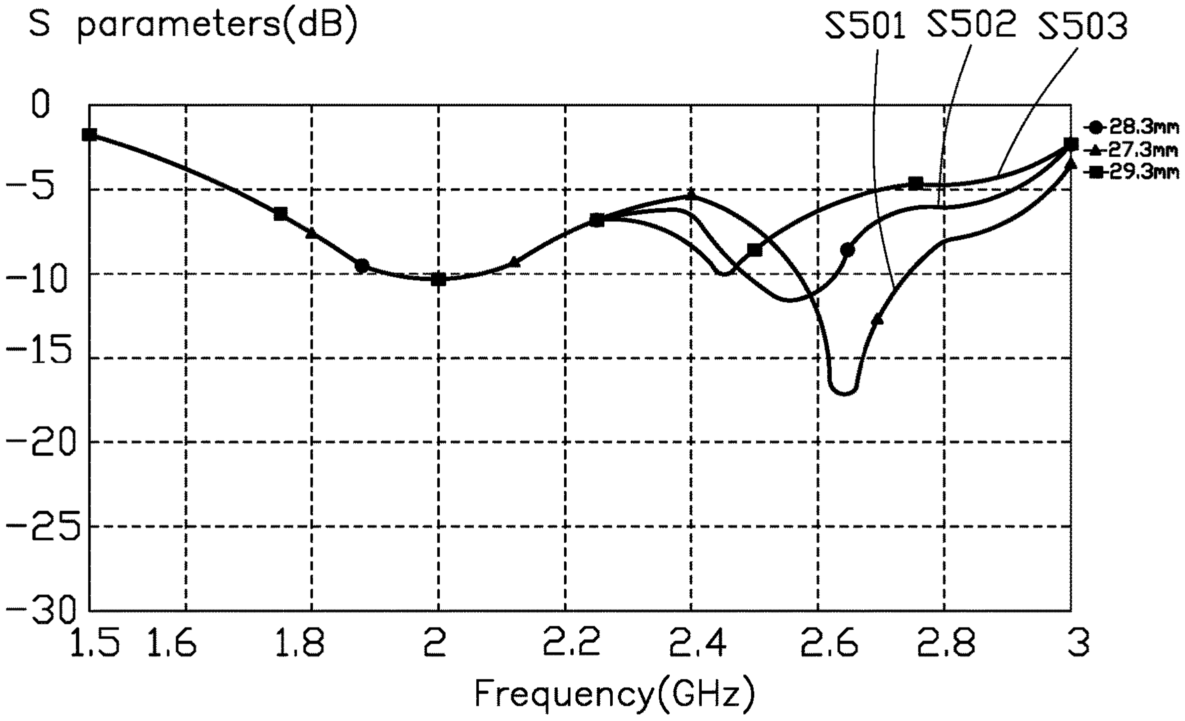
FIG. 5 is a graph of scattering parameters (S parameters) when a first side slot of the antenna structure has different lengths according to the first embodiment of the present application.

FIG. 5 is a graph of scattering parameters (S parameters) of the antenna structure 100 when the first groove 210 has different lengths. Wherein, a curve S501 is a graph of S parameters of the antenna structure 100 when the first groove 210 is 27.3 millimeters long; a curve S502 is a graph of S parameters of the antenna structure 100 when the first groove 210 is 28.3 millimeters long. Comparing the curve S501 with the curve S502, the high frequency (2496-2690 MHz) mode is shifted towards the 2690 MHz frequency. A curve S503 is a graph of S parameters of the antenna structure 100 when the first groove 210 is 29.3 millimeters long. Comparing the curve S503 with the curve S502, the high frequency (2496-2690 MHz) mode is shifted towards the 2496 MHz.

Obviously, when the length of the first groove 210 is reduced, the high frequency (2496-2690 MHz) mode is shifted towards a higher frequency within the frequency range; when the length of the first groove 210 is increased, the high frequency (2496-2690 MHz) mode is shifted towards a lower frequency within the frequency range.

Referring to FIG. 4, in at least one embodiment, an inductance of each of the first matching circuit 110, the second matching circuit 120, and the third matching circuit 130 may be a fixed value. By adjusting a length of the second groove 220, the middle frequency (1710-2170 MHz) mode offset can be adjusted.

Figure 6:
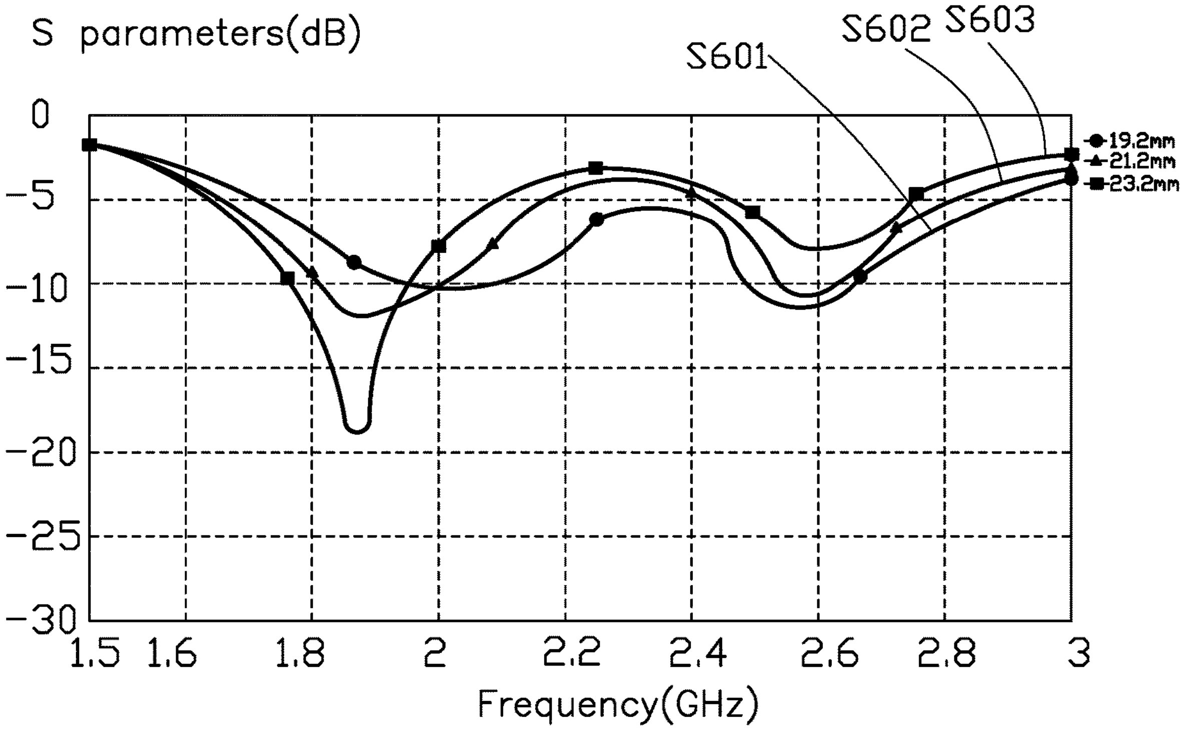
FIG. 6 is a graph of S parameters when a second side slot of the antenna structure has different lengths according to the first embodiment of the present application.

FIG. 6 is a graph of scattering parameters (S parameters) of the antenna structure 100 when the second groove 220 has different lengths. Wherein, a curve S601 is a graph of S parameters of the antenna structure 100 when the second groove 220 is 19.2 millimeters long; a curve S602 is a graph of S parameters of the antenna structure 100 when the second groove 220 is 21.2 millimeters long. Comparing the curve S601 with the curve S602, the middle frequency (1710-2170 MHz) mode is shifted towards the range of 1920-2170 MHz. A curve S603 is a graph of S parameters of the antenna structure 100 when the second groove 220 is 23.2 millimeters long. Comparing the curve S603 with the curve S602, the middle frequency (1710-2170 MHz) mode is shifted towards the range of 1710-1880 MHz.

Obviously, when the length of the second groove 220 is reduced, the middle frequency (1710-2170 MHz) mode is shifted towards a higher frequency within the frequency range; when the length of the second groove 220 is increased, the middle frequency (1710-2170 MHz) mode is shifted towards a lower frequency within the frequency range.

Figure 7:
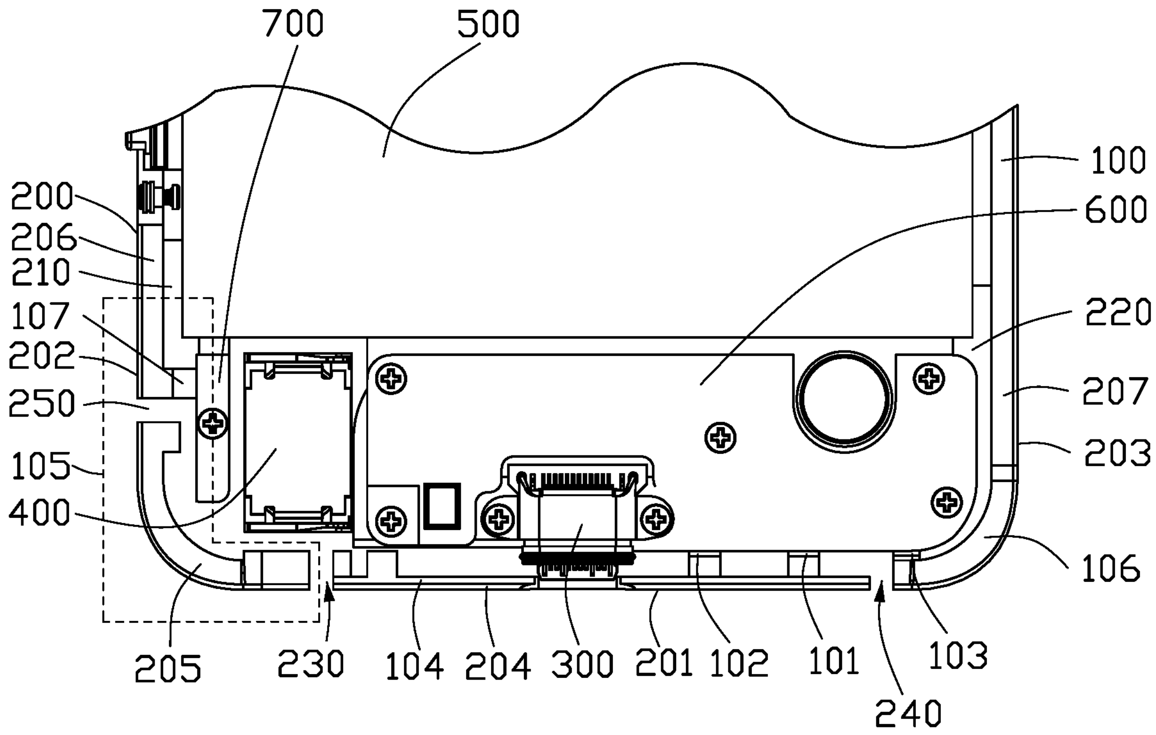
FIG. 7 is a schematic diagram of a wireless communication device having an antenna structure according to a second embodiment of the present application.

FIG. 7 is a schematic diagram of a wireless communication device having an antenna structure according to a second embodiment of the present application. Comparing the wireless communication device of the second embodiment with the wireless communication device of the first embodiment, the wireless communication device 1 further includes a second circuit board 700, the antenna structure 100 further includes a first switch 107. The second circuit board 700 is spaced apart from the second side 202 and the speaker 400. The first switch 107 is spaced apart from the second side 202 and the second circuit board 700. An end of the first switch 107 is electrically connected to the second radiating portion 105, the other end of the first switch 107 is grounded. The first switch 107 is configured to adjust the high frequency band of the second radiating portion 105.

Figure 8:
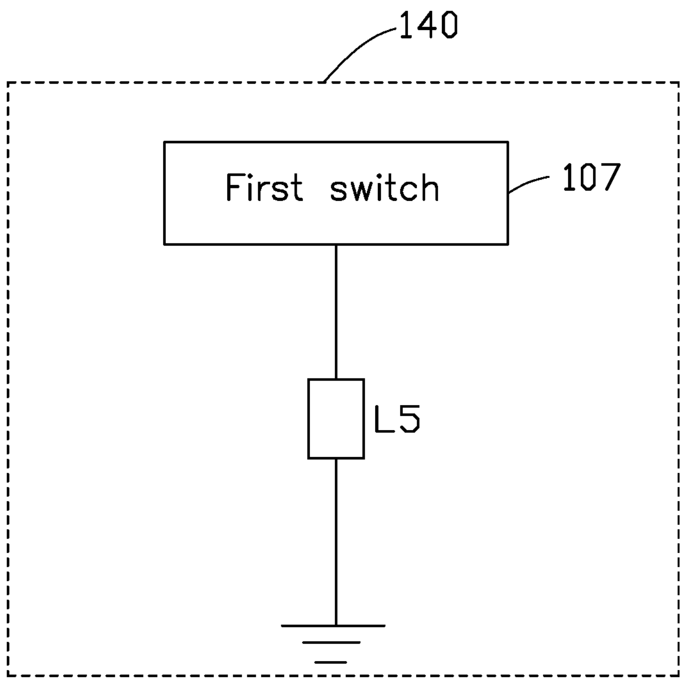
FIG. 8 is a circuit diagram of a first switch circuit of the antenna structure according to the second embodiment of the present application.

Referring to FIG. 8, the first switching circuit 140 includes the first switch 107 and a fifth inductor L5. One end of the fifth inductor L5 is electrically connected to the first switch 107, the other end of the fifth inductor L5 is grounded.

Referring to FIG. 7, an inductance of each of the first matching circuit 110, the second matching circuit 120, and the third matching circuit 130 may be a fixed value, and the length of the first groove 210 may be fixed. By adjusting an inductance of the first switching circuit 140, the high frequency (2496-2690 MHz) mode offset can be adjusted, for receiving and transmitting wireless signals in the high frequency (2496-2690 MHz).

Figure 9:
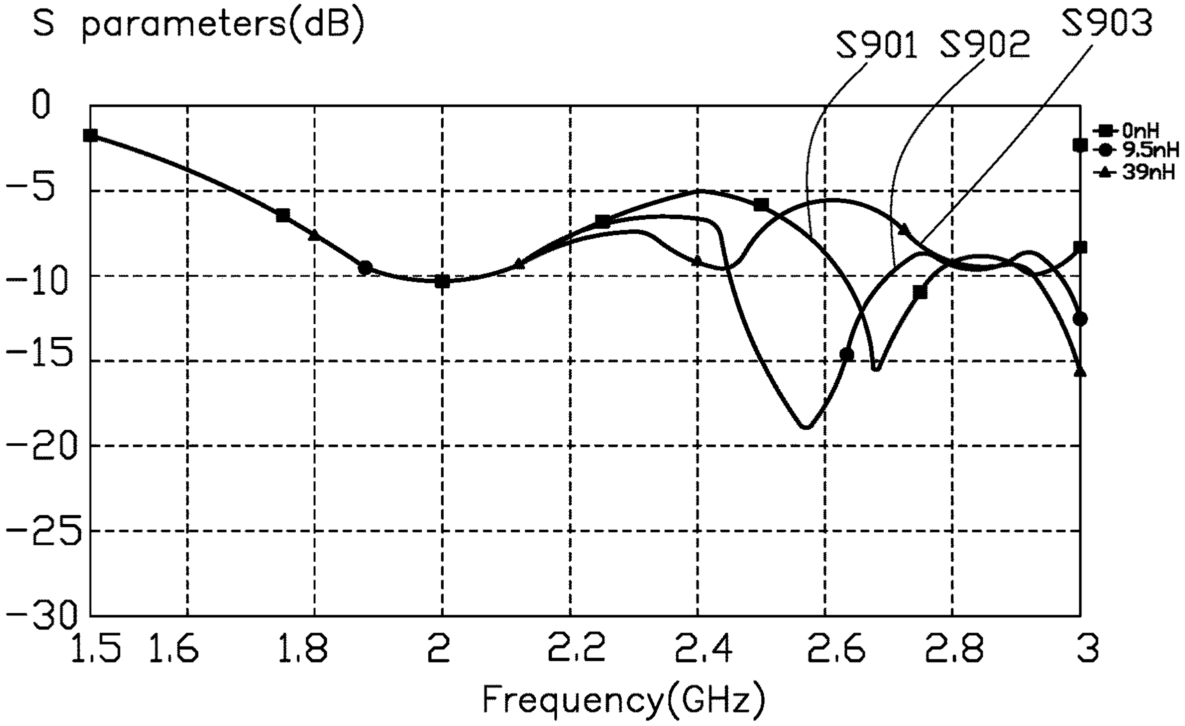
FIG. 9 is a graph of S parameters when the first switch circuit of the antenna structure has different inductances according to the second embodiment of the present application.

FIG. 9 is a graph of scattering parameters (S parameters) of the antenna structure 100 of the second embodiment when the first switching circuit 140 has different inductances. Wherein, a curve S901 is a graph of S parameters of the antenna structure 100 of the second embodiment when the first switching circuit 140 has an inductance of 0 nanohenry (nH); a curve S902 is a graph of S parameters of the antenna structure 100 of the second embodiment when the first switching circuit 140 has an inductance of 9.5 nH. Comparing the curve S901 with the curve S902, the high frequency (2496-2690 MHz) mode is shifted towards the 2690 MHz. A curve S903 is a graph of S parameters of the antenna structure 100 of the second embodiment when the first switching circuit 140 has an inductance of 39 nH. Comparing the curve S903 with the curve S902, the high frequency (2496-2690 MHz) mode is shifted towards the 2496 MHz.

Obviously, decreasing the inductance of the first switching circuit 140 shifts the high frequency (2496-2690 MHz) mode towards a higher frequency within the frequency range; increasing the inductance of the first switching circuit 140 shifts the high frequency (2496-2690 MHz) mode towards a lower frequency within the frequency range.

Figure 10:
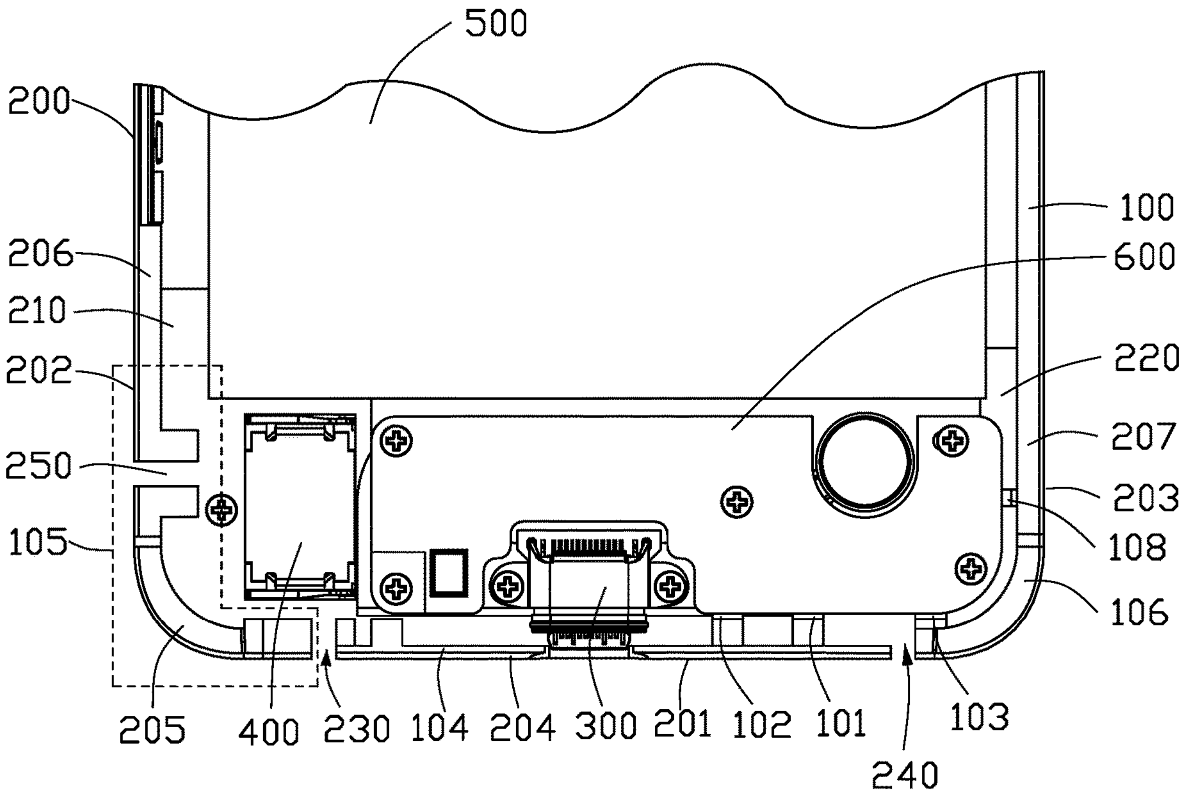
FIG. 10 is a schematic diagram of a wireless communication device having an antenna structure according to a third embodiment of the present application.

FIG. 10 is a schematic diagram of a wireless communication device having an antenna structure according to a third embodiment of the present application. Comparing the wireless communication device of the third embodiment with the wireless communication device of the first embodiment, the antenna structure 100 further includes a second switch 108. The second switch 108 is spaced apart from the first circuit board 600 and the third side 203. One end of the second switch 108 is electrically connected to the third radiating portion 106, the other end of the second switch 108 is grounded. The second switch 108 is configured to adjust the middle frequency band of the third radiating portion 106.

Figure 11:
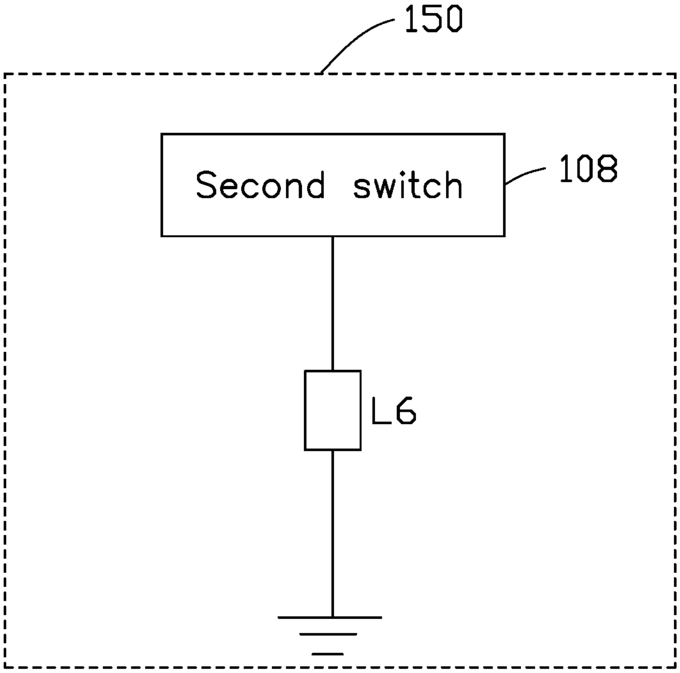
FIG. 11 is a circuit diagram of a second switch circuit of the antenna structure according to the third embodiment of the present application.

Referring to FIG. 11, the second switching circuit 150 includes the second switch 108 and a sixth inductor L6. One end of the sixth inductor L6 is electrically connected to the second switch 108, the other end of the sixth inductor L6 is grounded.

Referring to FIG. 10, an inductance of each of the second matching circuit 120 and the third matching circuit 130 may be a fixed value, and the length of the second groove 220 may be fixed. By adjusting an inductance of the second switching circuit 150, the middle frequency (1710-2170 MHz) mode offset can be adjusted, for receiving and transmitting wireless signals in the middle frequency (1710-2170 MHz).

Figure 12:
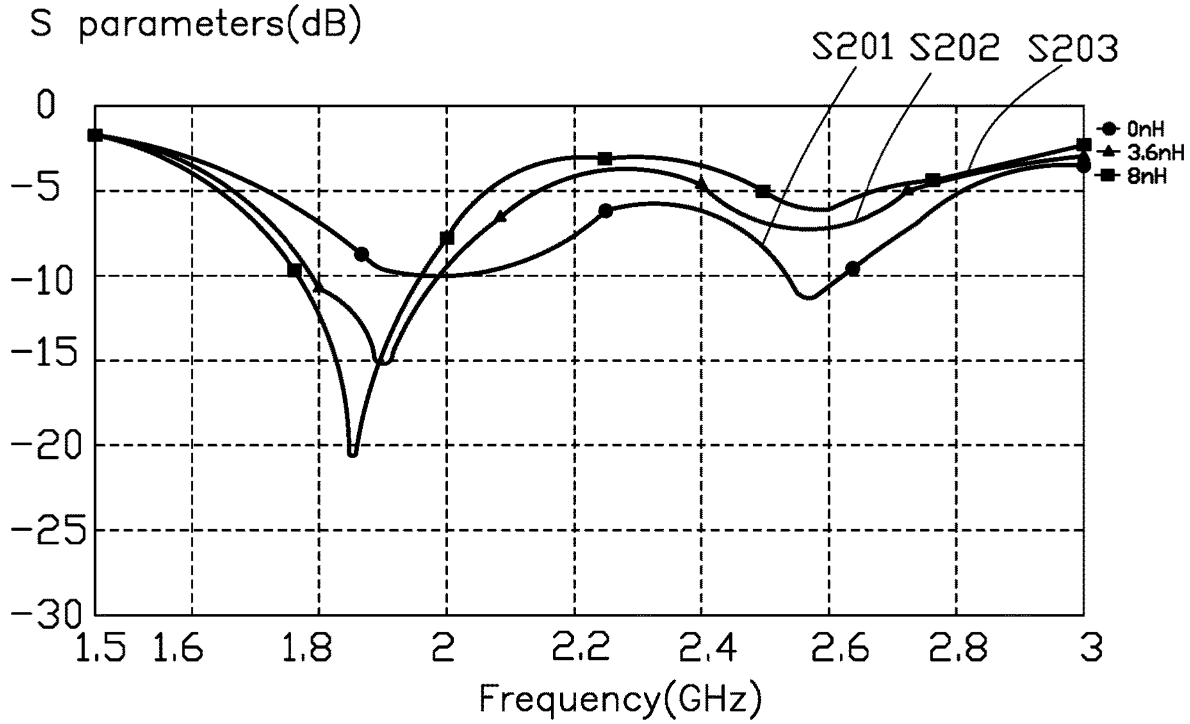
FIG. 12 is a graph of S parameters when the second switch circuit of the antenna structure has different inductances according to the third embodiment of the present application.

FIG. 12 is a graph of scattering parameters (S parameters) of the antenna structure 100 of the third embodiment when the second switching circuit 150 has different inductances. Wherein, a curve S201 is a graph of S parameters of the antenna structure 100 of the third embodiment when the second switching circuit 150 has an inductance of 0 nH; a curve S202 is a graph of S parameters of the antenna structure 100 of the third embodiment when the second switching circuit 150 has an inductance of 3.6 nH. Comparing the curve S201 with the curve S202, the middle frequency (1710-2170 MHz) mode is shifted towards the 2170 MHz. A curve S203 is a graph of S parameters of the antenna structure 100 of the third embodiment when the second switching circuit 150 has an inductance of 8 nH. Comparing the curve S203 with the curve S202, the middle frequency (1710-2170 MHz) mode is shifted towards the 1710 MHz frequency.

Obviously, decreasing the inductance of the second switching circuit 150 shifts the middle frequency (1710-2170 MHz) mode towards a higher frequency within the frequency range; increasing the inductance of the second switching circuit 150 shifts the middle frequency (1710-2170 MHz) mode towards a lower frequency within the frequency range.

Figure 13:
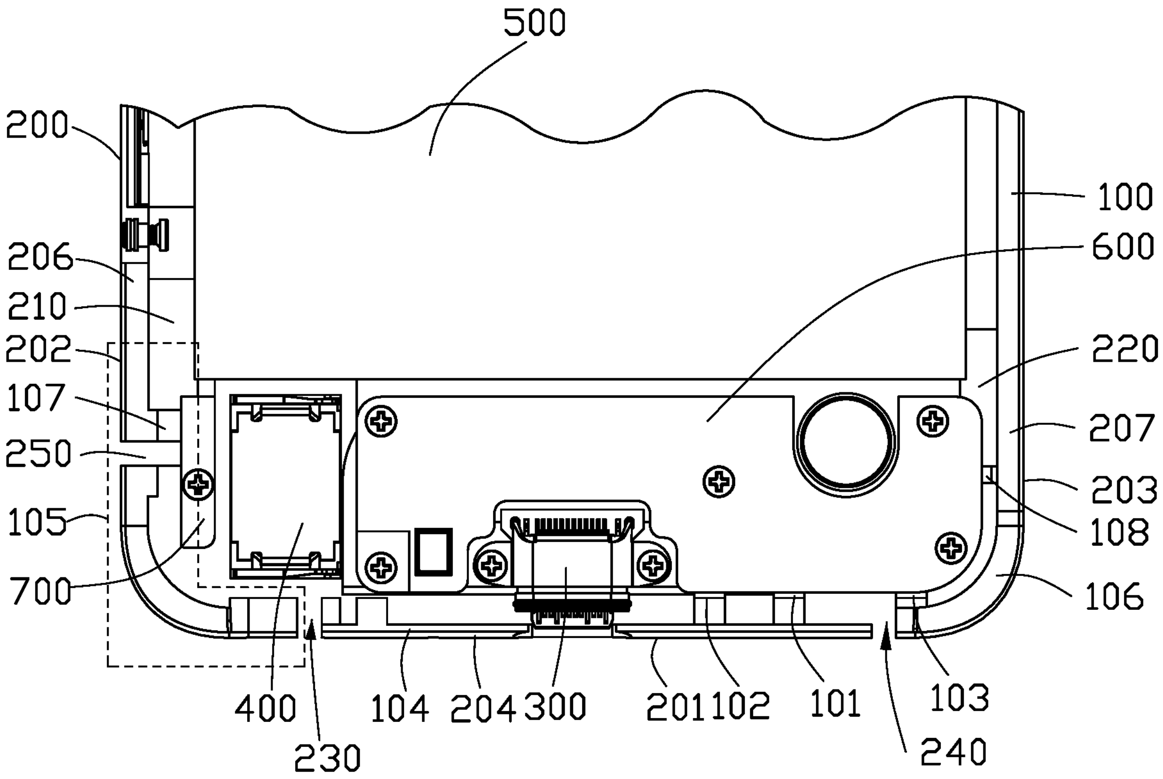
FIG. 13 is a schematic diagram of a wireless communication device having an antenna structure according to a fourth embodiment of the present application.

FIG. 13 is a schematic diagram of a wireless communication device having an antenna structure according to a fourth embodiment of the present application. Comparing the wireless communication device of the fourth embodiment with the wireless communication device of the first embodiment, the wireless communication device 1 further includes a second circuit board 700, the antenna structure 100 further includes the first switch 107 and the second switch 108. The second circuit board 700 is spaced apart from the second side 202 and the speaker 400. The first switch 107 is spaced apart from the second side 202 and the second circuit board 700. One end of the first switch 107 is electrically connected to the second radiating portion 105, the other end of the first switch 107 is grounded. The first switch 107 is configured to adjust the high frequency band of the second radiating portion 105. The second switch 108 is spaced apart from the first circuit board 600 and the third side 203. One end of the second switch 108 is electrically connected to the third radiating portion 106, the other end of the second switch 108 is grounded. The second switch 108 is configured to adjust the middle frequency band of the third radiating portion 106.

Referring to FIG. 13, an inductance of each of the second matching circuit 120 and the third matching circuit 130 may be a fixed value, and the length of the first groove 210 and of the second groove 220 may be fixed. By synchronously adjusting an inductance of each of the first switching circuit 140 and the second switching circuit 150, the middle frequency (1710-2170 MHz) mode and the high frequency (2496-2690 MHz) offset can be adjusted, for receiving and transmitting wireless signals in the middle frequency (1710-2170 MHz) and the high frequency (2496-2690 MHz).

Figure 14:
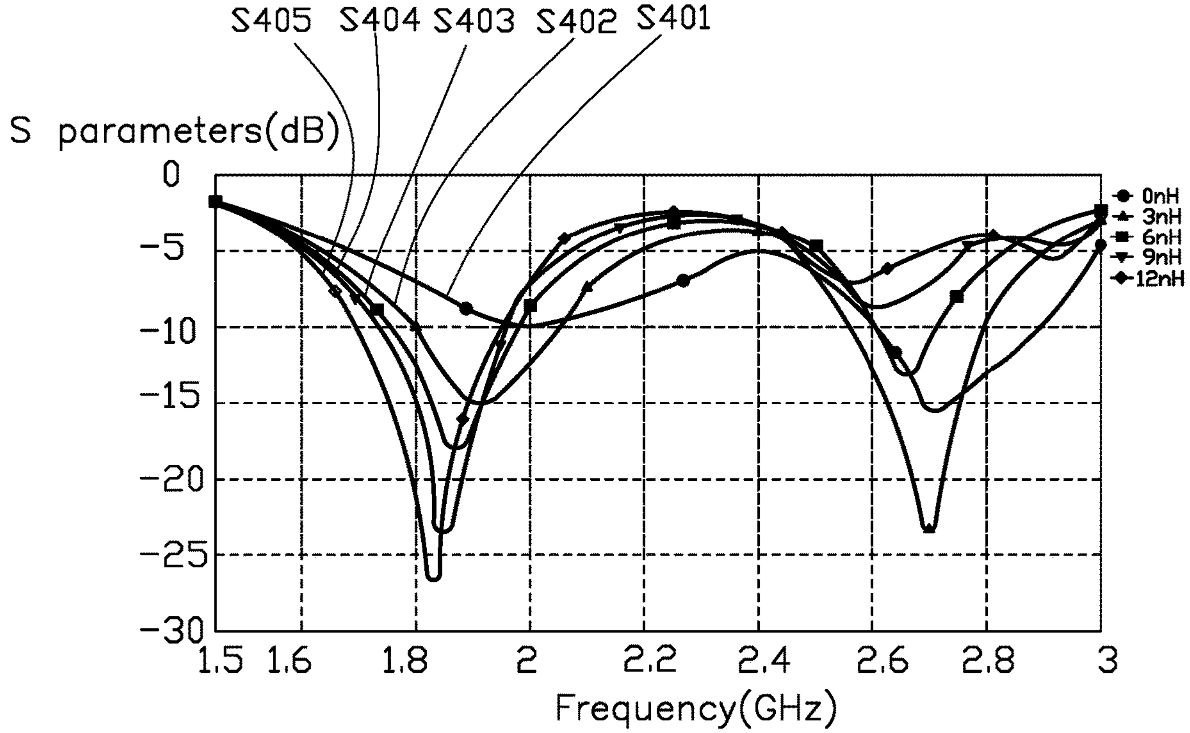
FIG. 14 is a graph of S parameters when the first switch circuit and the second switch circuit of the antenna structure are synchronously adjusted according to the fourth embodiment of the present application.

FIG. 14 is a graph of scattering parameters (S parameters) of the antenna structure 100 of the fourth embodiment when the first switching circuit 140 and the second switching circuit 150 are synchronously changed. Wherein, a curve S401 is a graph of S parameters of the antenna structure 100 of the fourth embodiment when each of the first switching circuit 140 and the second switching circuit 150 has an inductance of 0 nH; a curve S402 is a graph of S parameters of the antenna structure 100 of the fourth embodiment when each of the first switching circuit 140 and the second switching circuit 150 has an inductance of 3 nH; a curve S403 is a graph of S parameters of the antenna structure 100 of the fourth embodiment when each of the first switching circuit 140 and the second switching circuit 150 has an inductance of 6 nH; a curve S404 is a graph of S parameters of the antenna structure 100 of the fourth embodiment when each of the first switching circuit 140 and the second switching circuit 150 has an inductance of 9 nH; a curve S405 is a graph of S parameters of the antenna structure 100 of the fourth embodiment when each of the first switching circuit 140 and the second switching circuit 150 has an inductance of 12 nH. Comparing the curves S901, S902, S903, S904, and S905, synchronous adjustment of the inductances of each of the first switching circuit 140 and the second switching circuit 150, provides a shift of the middle frequency (1710-2170 MHz) mode and the high frequency (2496-2690 MHz) mode towards a higher frequency when the value of inductance is decreased; when the inductance is increased, the middle frequency (1710-2170 MHz) mode and the high frequency (2496-2690 MHz) mode are shifted towards the middle frequency.

The antenna structure and the wireless communication device of the present disclosure may transmit and receive wireless signals in the middle frequency (1710-2170 MHz) and the high frequency (2496-2690 MHz) ranges covering 4G LTE, and additional frequencies are obtainable by adding adjusting structures and adding an antenna circuit switching platform, such additions allowing adjustment of the middle frequency and the high frequency ranges.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. An antenna structure applied in a wireless communication device, the antenna structure comprising:

a metal frame, the metal frame defining a first gap, a second gap, a third gap, a first radiating portion, a second radiating portion, and a third radiating portion, wherein a portion of the metal frame between the first gap and the second gap forming the first radiating portion, a portion of the metal frame between the first gap and the third gap and a portion of the metal frame on a side of the third gap away from the first radiating portion cooperatively forming the second radiating portion, a portion of the metal frame on a side of the second gap opposite to the first radiation portion forming the third radiating portion;

a feeding portion electrically connected to the first radiating portion;

a first ground portion spaced apart from the feeding portion and electrically connected to the first radiating portion; and a second ground portion near the second gap and electrically connected to the third radiating portion, wherein when the feeding portion feeding current, the first radiating portion conducting the current to the second gap, the third radiating portion coupling the current and conducting the current to ground through the second ground portion, thereby exciting a first mode to generate a radiation signal in a first radiation frequency band; and when the feeding portion feeding current, the first radiating portion conducting the current to the first gap and the third gap, the second radiating portion coupling the current and conducting the current to ground through the first ground portion, thereby exciting a second mode to generate a radiation signal in a second radiation frequency band;

wherein the antenna structure further comprises a first matching circuit, a second matching circuit, and a third matching circuit; the wireless communication device further comprises a first circuit board and a battery; wherein the feeding portion is electrically connected to a feed source of the first circuit board through the first matching circuit to feed current; the first ground portion is grounded through the second matching circuit to ground the antenna structure; the second ground portion is grounded through the third matching circuit to ground the antenna structure;

wherein the antenna structure further comprises a second switch and a second switching circuit; the second switch is spaced apart from the first circuit board and the third radiating portion; one end of the second switch is electrically connected to the third radiating portion, the other end of the second switch is grounded, the second switch is configured to adjust the first radiation frequency band of the third radiating portion; the second switching circuit comprises the second switch; the third radiating portion is spaced apart from the first circuit board to form a second groove; an inductance of each of the first matching circuit and the second matching circuit is a fixed value, a length of the second groove is fixed, the first radiation frequency band is adjustable by adjusting an inductance of the second switching circuit, for receiving and transmitting wireless signals in a middle frequency band.

2. The antenna structure of claim 1, wherein the second radiating portion is spaced apart from the battery to form a first groove; an inductance of each of the feeding portion, the first matching circuit, and the second matching circuit is a fixed value, the second radiation frequency band is adjustable by adjusting a length of the first groove.

3. The antenna structure of claim 1, further comprising a first switch, wherein the wireless communication device comprises a second circuit board, the second circuit board is spaced apart from the second radiating portion; the first switch is spaced apart from the second radiating portion and the second circuit board; one end of the first switch is electrically connected to the second radiating portion, the other end of the first switch is grounded, the first switch is configured to adjust the second radiating frequency band of the second radiating portion.

4. The antenna structure of claim 3, wherein the antenna structure further comprises a first switching circuit; the first switching circuit comprises the first switch; an inductance of each of the second matching circuit and the third matching circuit is a fixed value, a length of each of a first groove and the second groove is fixed, the first radiating frequency band and the second radiating frequency band are adjustable by synchronously adjusting an inductance of each of the first switching circuit and the second switching circuit, for transmitting and receiving wireless signals in a middle frequency band and a high frequency band.

5. A wireless communication device comprising an antenna structure, the antenna structure comprising:

a metal frame, the metal frame defining a first gap, a second gap, a third gap, a first radiating portion, a second radiating portion, and a third radiating portion, wherein a portion of the metal frame between the first gap and the second gap forming the first radiating portion, a portion of the metal frame between the first gap and the third gap and a portion of the metal frame on a side of the third gap away from the first radiating portion cooperatively forming the second radiating portion, a portion of the metal frame on a side of the second gap opposite to the first radiation portion forming the third radiating portion;

a feeding portion electrically connected to the first radiating portion;

a first ground portion spaced apart from the feeding portion and electrically connected to the first radiating portion; and a second ground portion near the second gap and electrically connected to the third radiating portion, wherein when the feeding portion feeding current, the first radiating portion conducting the current to the second gap, the third radiating portion coupling the current and conducting the current to ground through the second ground portion, thereby exciting a first mode to generate a radiation signal in a first radiation frequency band; and when the feeding portion feeding current, the first radiating portion conducting the current to the first gap and the third gap, the second radiating portion coupling the current and conducting the current to ground through the first ground portion, thereby exciting a second mode to generate a radiation signal in a second radiation frequency band;

wherein the antenna structure further comprises a first matching circuit, a second matching circuit, and a third matching circuit; the wireless communication device further comprises a first circuit board and a battery; wherein the feeding portion is electrically connected to a feed source of the first circuit board through the first matching circuit to feed current; the first ground portion is grounded through the second matching circuit to ground the antenna structure; the second ground portion is grounded through the third matching circuit to ground the antenna structure;

wherein the antenna structure further comprises a second switch and a second switching circuit; the second switch is spaced apart from the first circuit board and the third radiating portion; one end of the second switch is electrically connected to the third radiating portion, the other end of the second switch is grounded, the second switch is configured to adjust the first radiation frequency band of the third radiating portion; the second switching circuit comprises the second switch; the third radiating portion is spaced apart from the first circuit board to form a second groove; an inductance of each of the first matching circuit and the second matching circuit is a fixed value, a length of the second groove is fixed, the first radiation frequency band is adjustable by adjusting an inductance of the second switching circuit, for receiving and transmitting wireless signals in a middle frequency band.

6. The wireless communication device of claim 5, wherein the second radiating portion is spaced apart from the battery to form a first groove; an inductance of each of the feeding portion, the first matching circuit, and the second matching circuit is a fixed value, the second radiation frequency band is adjustable by adjusting a length of the first groove.

7. The wireless communication device of claim 5, wherein the antenna structure further comprises a first switch, the second circuit board is spaced apart from the second radiating portion; the first switch is spaced apart from the second radiating portion and the second circuit board; one end of the first switch is electrically connected to the second radiating portion, the other end of the first switch is grounded, the first switch is configured to adjust the second radiating frequency band of the second radiating portion.

8. The wireless communication device of claim 7, wherein the antenna structure further comprises a first switching circuit; the first switching circuit comprises the first switch; an inductance of each of the second matching circuit and the third matching circuit is a fixed value, a length of each of the first groove and the second groove is fixed, the first radiation frequency band and the second radiating frequency band are adjustable by synchronously adjusting an inductance of each of the first switching circuit and the second switching circuit, for transmitting and receiving wireless signals in a middle frequency band and a high frequency band.

* * * * *